Feb. 2, 1937. C. MORTENSEN 2,069,555
HEAT EXCHANGE APPARATUS
Filed Aug. 4, 1936 3 Sheets-Sheet 1
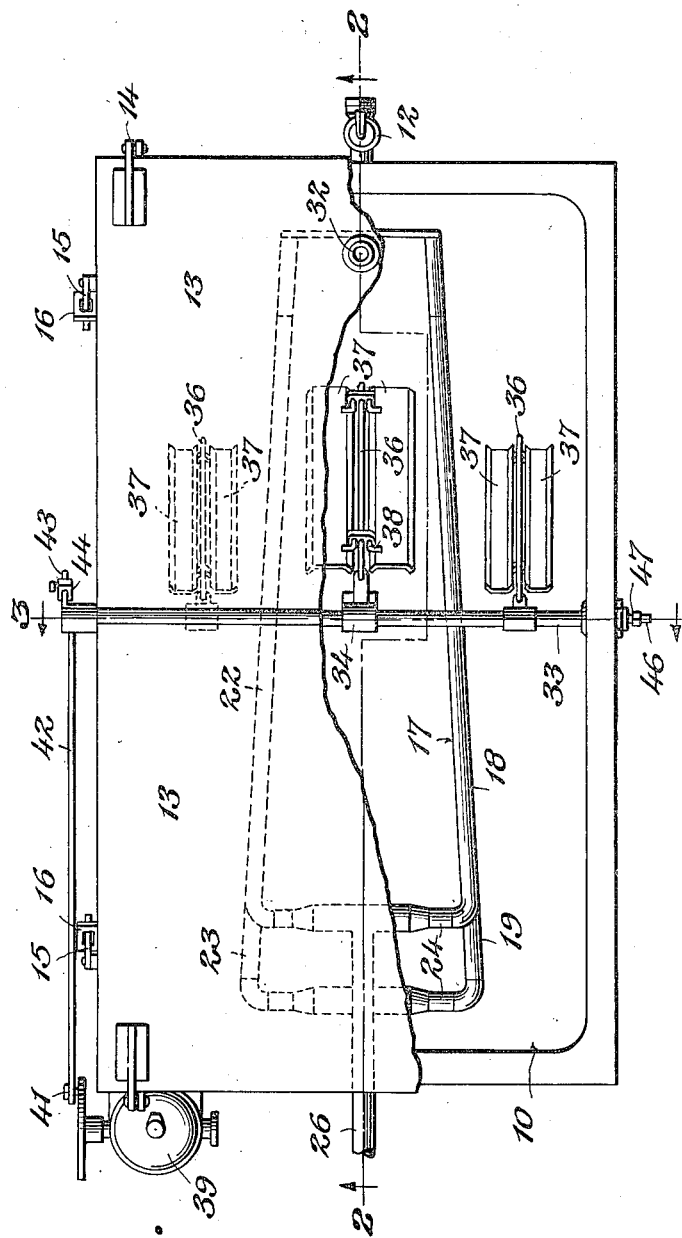
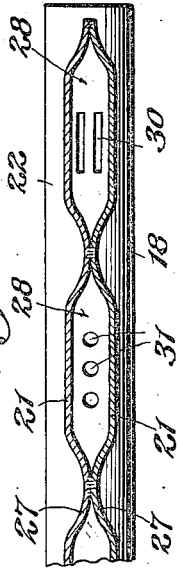
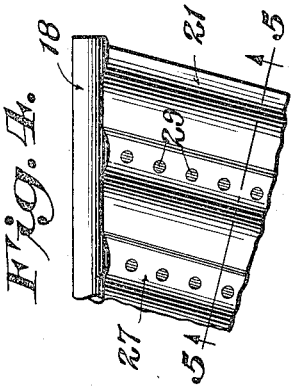
Inventor
Cornelius Mortensen,
By D. P. Wolhaupter
Attorney Feb. 2, 1937.  C. MORTENSEN  2,069,555
HEAT EXCHANGE APPARATUS
Filed Aug. 4, 1936  3 Sheets-Sheet 2
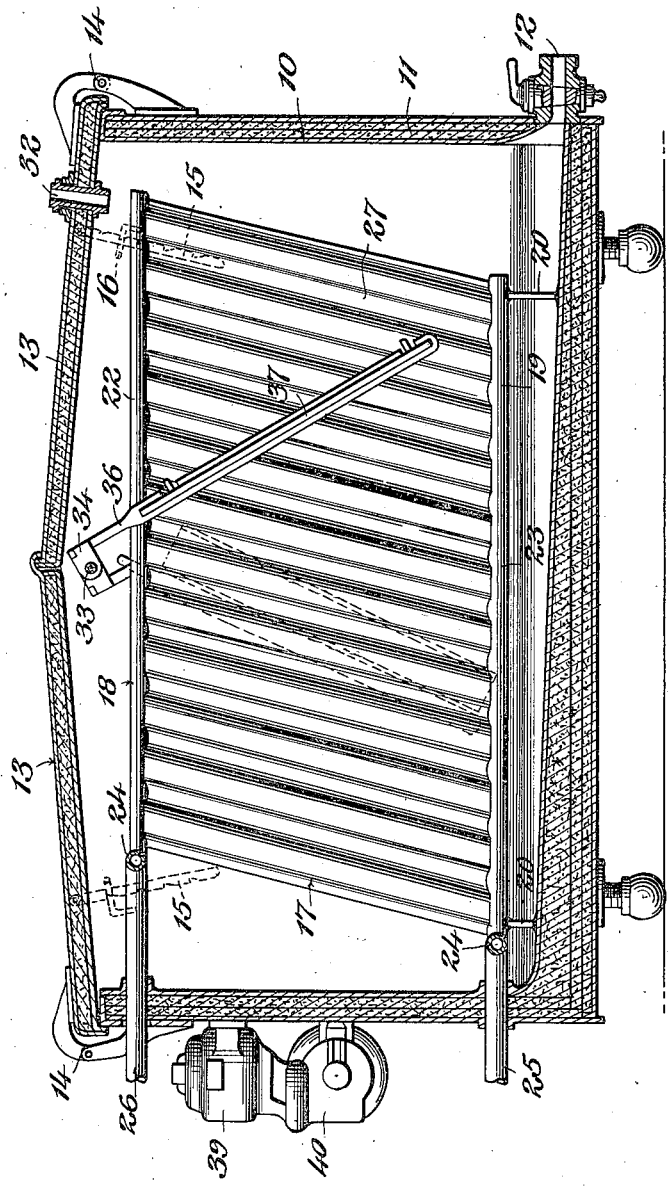
Inventor
Cornelius Mortensen,
By D. P. Wolhaupter
Attorney Feb. 2, 1937.  C. MORTENSEN  2,069,555
HEAT EXCHANGE APPARATUS
Filed Aug. 4, 1936   3 Sheets-Sheet 3
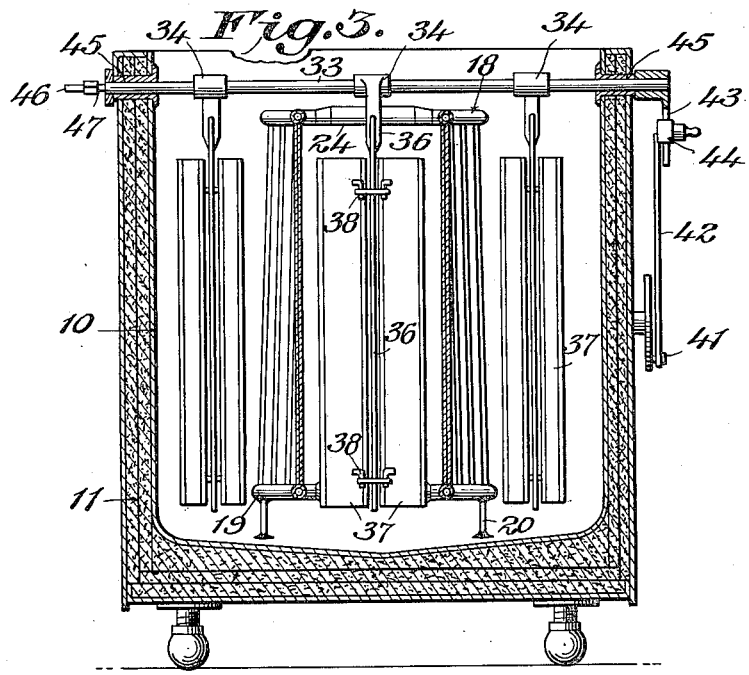
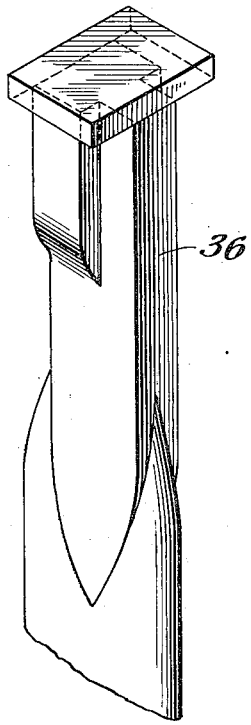
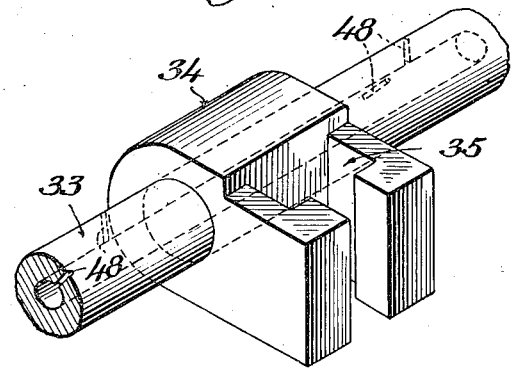

Patented Feb. 2, 1937

2,069,555

UNITED STATES PATENT OFFICE 2,069,555

HEAT EXCHANGE APPARATUS

Cornelius Mortensen, Louisville, Ky.

Application August 4, 1936, Serial No. 94,259

12 Claims. (Cl. 257—76)

This invention relates to heat exchange apparatus and has particular reference to an improved apparatus especially designed for heating, cooling, agitating, holding, or storing milk or other liquids.

One object of the invention is to provide a milk or other liquid heating or cooling apparatus embodying a tank to contain the milk or other liquid, a cover for said tank, and heating or cooling means and also agitating means, all disposed relatively to one another in such manner as to facilitate thorough cleaning of all parts of the apparatus, the cleaning being expedited by large radius corners and fillets employed throughout the apparatus.

Another object of the invention is to provide a novel form of heating or cooling means and agitating means cooperating in a novel manner with said heating or cooling means to agitate and circulate the milk or other liquid by imparting a rolling movement thereto, effective to remove air and gases therefrom without churning or aerating the liquid.

Another object of the invention is to provide a heat exchange apparatus embodying the foregoing features in which the cover sections are, or may be, hinged to the liquid containing tank for easy swinging movement between raised and lowered positions, and in which the liquid containing tank is devoid of pockets in which if present the milk or other liquid might lodge and be not circulated during operation of the apparatus.

Another object of the invention is to provide a heat exchange apparatus embodying the features mentioned which is of simple, inexpensive construction and thoroughly reliable and efficient operation.

With the foregoing and other objects in view, which will become more fully apparent as the nature of the invention is better understood, the same consists in the novel features of construction, combination, and arrangement of parts as will be hereinafter more fully described, illustrated in the accompanying drawings and defined in the appended claims.

In the drawings, wherein like characters of reference denote corresponding parts in the different views:

Fig. 1 is a top plan view of an apparatus constructed in accordance with one practical embodiment of the invention, the tank cover sections being shown in closed position and being partly broken away.

Fig. 2 is a central, vertical, longitudinal section through the apparatus taken approximately on the line 2—2 of Fig. 1.

Fig. 3 is a cross section through the apparatus taken approximately on the line 3—3 of Figure 1, the tank cover sections being omitted and the agitators being shown in vertical position in this view.

Fig. 4 is an enlarged, fragmentary side elevation of a portion of the heating, or cooling element.

Fig. 5 is an enlarged section on the line 5—5 of Fig. 4.

Fig. 6 is a perspective view of one of agitator arms holding brackets which permits easy removal of the agitator arm for cleaning; and Fig. 7 is a perspective view of the top portion of one of the agitator arms formed to fit into the bracket of Fig. 6.

Referring to the drawings in detail, 10 designates a tank of suitable capacity which preferably is of elongated, rectangular shape, well covered at its sides, ends and bottom with suitable heat insulating material, designated as 11 and which is open at its top and preferably has its bottom sloping toward a drain cock 12 so that when said cock is opened all liquid readily drains from the tank.

The tank cover sections are designated as 13 and are hinged at the ends of the tank 10 on hinges 14, being supported by ratchets 15 and ratchet retainers 16 when in open position.

At 17 is designated, generally, the means for heating, or cooling milk or other liquid contained in tank 10. This means comprises an upper header 18 of substantially U-shape composed, for example, of pipe sections and fittings and disposed horizontally; a lower header 19, also of substantially U-shape, composed, for example, of pipe sections and fittings and disposed parallel, or substantially parallel, to the upper header 18 and supported upon the bottom of the tank by means of rods 20; and a pair of corrugated metal sheets or plates 21 substantially vertically disposed and connecting each side portion 22 of the upper header with the related side portion 23 of the lower header.

The connecting portion 24 between the side portions of each of the headers 18 and 20 is disposed adjacent to the rear end of the tank, the rear end, so called, being the end opposite the outlet valve, and from said connecting portions the side portions of each header preferably converge, or are inclined inwardly relative to each other, toward their free ends and also toward the front or outlet end of the tank. Thus, the respective pairs of plates 21 also converge or are inclined inwardly relative to each other toward the outlet end of the tank. Moreover, the respective pairs of plates 21 may, if desired, but not necessarily, converge or be inclined upwardly relative to each other so that the space between said pairs of plates not only narrows toward the outer end of the cover, but also narrows upwardly.

Inlet and outlet pipes 25 and 26 for hot, or cold liquid are connected with the cross portion 24 of the lower header 19 and the cross portion 24 of the upper header 18 respectively. Thus, hot or cold liquid supplied to the apparatus through the pipe 25 is required to pass first through the lower header 19 and then upwardly through the spaces between the corrugations of the plates 21 to the upper header, before it can escape through the outlet pipe 26.

As indicated in Figures 4 and 5 of the drawings, the corrugated plates 21 of each pair are oppositely disposed relative to each other with their ribs 27 abutting, thereby providing a series of separate, substantially vertical passageways 28 connecting each side of each header with the related side of the other header. The ribs 27 may be connected together by spot welding, as indicated at 29 in Figure 4, or in any other suitable manner, and communication between the passageways 28 and the side portions of the headers is afforded by means of slots 30 and/or round perforations 31 in the header side portions 22 and 23.

For the supply of milk or other liquid to the tank there is suspended from one cover section 13 a sanitary inlet pipe 32 to the bottom of which may be attached an elbow or any other fitting to direct the flow of incoming liquid and prevent splashing and foam.

In order that the heating, or cooling, means 17 may be of maximum length and depth and may, at the same time, be of such construction as to aid in directing or controlling the circulation of the milk, or other fluid, the bottom header 19 may be offset relative to the upper header 18 toward the rear end of the tank. Thus, the corrugations of the plates 21 may extend at inclinations downwardly and rearwardly.

The means for cooperation with the aforementioned heating, or cooling, means to agitate and circulate the milk or other fluid contained within the tank 10 preferably comprises three feathering paddle devices, one disposed between the two pairs of plates 21 and one disposed between each pair of plates 21 and the adjacent side wall of the tank 10. A horizontal shaft 33 extends transversely of the tank adjacent to the top and approximately midway between the ends thereof and has secured thereon three brackets 34, each having a socket 35 to removably receive and hold the upper end of a paddle carrying arm 36 of a related feathering paddle device.

On each of the arms 36 are hinged two blades as paddles 37 which extend substantially from top to bottom and substantially from side to side of the space they occupy between the two pairs of plates 21 and between each pair of said plates and the adjacent side wall of the tank, respectively. The blades 37 are hinged on either side of the related agitator arm 36 by means of hinge pins 38 in such manner that when the arm 36 of the center agitator is swung forwardly on the shaft 33, the blades 37 are extended to form a broad paddle with their inner edges engaging against the arm 36 to hold them extended so they will collectively cooperate to push milk or other liquid contained within the tank forwardly between the sides of the heating means 17. The hinging of said blades also is such that when the arm 36 is swung rearwardly the blades 37 feather, or swing together, on the hinge pins 38 and pass freely through the milk or other liquid contained in the tank. The blades 37 on the two outer arms 36 operate just oppositely to those on the center arm so that they push the milk, or other liquid, to the rear of the tank. Thus, the outer paddles give motion to the liquid while the center paddle is slipping through the liquid and vice versa. It follows, therefore, that by oscillating the arms 36 milk or other liquid contained in the tank has imparted thereto a continuous circulatory motion forwardly through the space between the sides of the heating means 17 and rearwardly on each side of the heating means 17. Moreover, it is apparent in this connection that a rolling or wave motion is imparted to the milk or other liquid and that the same is not churned. Therefore, the milk or other liquid is not aerated but is freed of any contained air or gas.

Any suitable means may be employed to oscillate the arms 36. For example and as illustrated in the present instance, there may be mounted on the rear of the tank an electric motor 39 operating through a reduction gear 40 to drive a crank pin 41 connected by a rod 42 with a crank arm 43 on the shaft 33, the connection 44 between the rod 42 and the crank arm 43 being adjustable along said crank arm to permit the stroke of the agitator arms to be varied, preferably without stopping the driving unit. The agitator drive shaft 33 preferably extends through oilless bearings 45 in the sides of the tank 10.

In order to maintain the air above the milk or other liquid at the desired temperature during the heating process, low pressure steam is introduced through a steam line 46 which is connected to the hollow shaft 33 by means of a stuffing gland 47. The steam is injected into the air under the cover 13 by way of small radial holes 48 in the shaft 33; see Figure 6. The holes 48 may also be used for high pressure steam injection for sterilization of the apparatus before and after operation.

The operation of the apparatus is believed to be clear. A heating or cooling fluid is circulated through the means 17 and milk or other liquid is supplied to the tank through the inlet pipe 32. When a sufficient quantity of liquid is contained within the tank the motor 39 is employed to oscillate the arms 36 and the blades 37 carried thereby, thus producing circulation of the liquid about the sides of the means 17, which circulation is assisted because of the convergence of the sides of said means in the direction in which the liquid is pushed by the blades. Moreover, due to the divergence of the sides of said means in the opposite direction, greater freedom of return movement of the blade or paddle means is obtained. In any event, the liquid is neither churned nor aerated, but the gentle rolling motion imparted to the liquid frees the same of any contained air or gas. When, finally, the liquid has been treated over a desired period of time, it is drawn off from the tank through the cock 12 and the cover sections are raised, thereby exposing the interior of the tank, from which the agitators may be easily lifted as explained heretofore, for thorough and expeditious cleansing. In this connection it is apparent that the construction of the apparatus is such as to avoid any pockets in which bodies of the liquid may remain at rest and be not circulated during operation of the apparatus. Also, all corners and fillets are of as large radius as is practical to further facilitate cleaning.

Obviously, the structure of the apparatus may be varied in many respects within the spirit and scope of the invention as defined in the appended claims. The blades 37 may, for example, pivot about a horizontal axis in which case the arm 34 would be divided or bifurcated to support said blades; the general arrangement may be such that the liquid is circulated oppositely to the direction of circulation effected by the apparatus illustrated; any equivalent of the pairs of plates 21 may be employed in lieu of said plates and any suitable means other than the means illustrated may be employed to actuate the circulating means; and finally the cover might be of one piece construction and the apparatus so designed that the heating and cooling means 17 and the agitator assembly 33 might be supported by said cover so that raising the cover would completely clear the tank and thus greatly facilitate cleaning.

I claim:—

1. Apparatus of the character described comprising a tank, a cover therefor, and a heat exchange unit within said tank, said unit comprising a substantially U-shaped upper header, a substantially U-shaped lower header, a pair of corrugated plates connecting each related pair of side portions of the respective headers and having spaced passageways therebetween communicating with the related header side portions, and means for the supply of a fluid to one of said headers and for its outlet from the other of said headers.

2. Apparatus of the character described comprising a tank, a cover therefor, a heat exchange unit within said tank comprising a pair of spaced side portions extending longitudinally of the tank, and oscillatory paddle devices, one disposed between the side portions of said heat exchange unit and one disposed between each of the side portions of the heat exchange unit and the adjoining tank wall, for effecting circulation of liquid in the tank about the side portions of said unit.

3. Apparatus as set forth in claim 2 in which the headers extend longitudinally of the tank and the lower header is offset relative to the upper header toward the rear end of the tank.

4. Apparatus of the character described comprising a tank, a heat exchange unit therein, a rockable transverse horizontal shaft adjacent to the top of the tank, means for rocking said shaft, an arm depending from said shaft, and blades pivoted to said arm to push liquid in the tank when the arm is rocked in one direction and to pass freely, or feather, through the liquid in the tank when the arm is rocked in the opposite direction.

5. Apparatus of the character described comprising a tank, a cover therefor, a heat exchange unit within said tank comprising a pair of spaced side portions extending longitudinally of the tank, and oscillatory paddle devices depending between and on either side of the side portions of said heat exchange unit and constructed so that when oscillated they produce a flow of liquid in the tank in a single direction longitudinally of the heat exchange unit between the side portions thereof and in an opposite direction between each side portion of said unit and the adjacent side of the tank.

6. Apparatus of the character described comprising a tank, a cover therefor, a heat exchange unit within said tank comprising a pair of spaced side portions extending longitudinally of the tank, and oscillatory paddle devices depending between and on either side of the side portions of said heat exchange unit and constructed so that when oscillated they produce a flow of liquid in the tank in a single direction longitudinally of the heat exchange unit between the side portions thereof and in an opposite direction between each side portion of said unit and the adjacent side of the tank, the side portions of the heat exchange unit converging relative to each other in the direction in which said paddle devices move the liquid between said side portions to facilitate the circulation of the liquid and the operation of said paddle devices.

7. Apparatus as set forth in claim 4 in which the arm is removably mounted on the shaft to facilitate cleaning of the arms, the blades and the tank.

8. Apparatus of the character described comprising a tank, a cover therefor, a heat exchange unit, within said tank, an oscillatory transverse horizontal hollow shaft mounted adjacent to the top of the tank, paddle devices carried by said shaft for circulating liquid in the tank about said heat exchange unit when said shaft is oscillated, means for oscillating said shaft, and means for the supply of steam to said shaft, said shaft having orifices for flow of steam into the tank.

9. Apparatus of the character described comprising a tank, a heat exchange unit therein comprising an upper header, a lower header, a pair of plates connecting said headers and having separate spaces therebetween communicating with said headers, means for the supply of a fluid to one of said headers and for its outlet from the other header, and means for circulating liquid within said tank about said unit.

10. Apparatus of the character described comprising a tank, a heat exchange unit within said tank, a horizontal shaft mounted transversely of said tank adjacent to the top thereof, means for oscillating said shaft, a bracket carried by said shaft, said bracket having a socket, an arm removably mounted at its upper end in said socket and depending from said shaft, and blades pivoted to said arm for swinging movements relative thereto to positions in which they push liquid contained in the tank when the arm is swung in one direction, and for swinging movements relative to said arm to positions in which they feather or pass substantially freely through liquid contained in the tank when the arm is swung in the opposite direction.

11. Apparatus as set forth in claim 10 in which the heat exchange unit comprises spaced side portions and in which an arm and its blades depends from said shaft between said unit side portions and another arm and its blades depend between each side portion of said unit and the adjacent side of the tank.

12. Apparatus as set forth in claim 10 in which the heat exchange unit comprises spaced side portions converging longitudinally and vertically upward toward one end of the tank, in which an arm and its blades depend from the shaft between said unit side portions and another arm and its blades depend from said shaft between each side portion of the unit and the adjacent side of the tank, and in which the blades of the last mentioned arms operate to push liquid in a direction opposite to the blades of the first mentioned arm.

CORNELIUS MORTENSEN.